United States Patent [19]

Takahashi et al.

[11] 3,895,820

[45] July 22, 1795

[54] VEHICLE-HEIGHT CONTROL DEVICE

[75] Inventors: Noriyuki Takahashi; Hiromitsu Miyahara, both of Tokyo; Hidehiko Inoue, Oimachi, all of Japan

[73] Assignee: Honda Giken Kogyo Kabushiki Kaisha, Tokyo, Japan

[22] Filed: Mar. 8, 1974

[21] Appl. No.: 449,470

[30] Foreign Application Priority Data
Mar. 12, 1973  Japan............................ 48-28784

[52] U.S. Cl. .......................... 280/124 F; 267/64 A
[51] Int. Cl.² ......................................... B60G 13/08
[58] Field of Search ........ 280/112 R, 112 A, 124 F, 280/6 R, 6 H, 6.1, 6.11; 267/64 R, 64 A, 24

[56] References Cited
UNITED STATES PATENTS

| | | |
|---|---|---|
| 2,903,271 | 9/1959 | Vogel............................ 280/112 A |
| 3,380,247 | 4/1968 | Colmerauer ..................... 267/64 R |
| 3,550,993 | 12/1970 | Peiffer............................ 280/124 F |
| 3,582,106 | 6/1971 | Keijzer ............................ 280/124 F |
| 3,778,081 | 12/1973 | Takahashi....................... 280/112 A |

*Primary Examiner*—Philip Goodman
*Assistant Examiner*—John A. Carroll
*Attorney, Agent, or Firm*—Waters, Schwartz & Nissen

[57] ABSTRACT

In an automatic vehicle-height control device for automobiles or like vehicles having hydraulic cylinder assemblies disposed between the body frame and respective road wheels of the vehicle for height control, the interior spaces of each pair of the hydraulic cylinder assemblies positioned on the right and left sides of the vehicle being communicated with each other through a restricted orifice device, and hence held balanced in pressure during turning movement of the vehicle, whereby the vehicle can be ordinarily inclined sidewise under a centrifugal effect.

8 Claims, 2 Drawing Figures

VEHICLE-HEIGHT CONTROL DEVICE

BACKGROUND OF THE INVENTION

This invention relates to automatic vehicle-height control devices for automobiles or like vehicles and operable under the pressure of oil or other fluid to automatically compensate for change in height of the vehicle.

DISCUSSION OF THE PRIOR ART

Vehicle-height control devices are already well-known which are capable of holding, at all times, the height of a vehicle at a normal level irrespective of passenger load by the use of vehicle-height controlling hydraulic cylinder assemblies, which are arranged between the body frame and respective wheels of the vehicle and are operable upon detecting displacement of the wheel suspension members as occurring with change in height of the vehicle.

In this case, in order not to impair the damping function of the wheel suspension members, it is required for the conventional type of vehicle-height control devices to be designed to have a low sensitivity to the displacement of the wheel suspension members. With such an arrangement of the device as designed above, however, the following danger may happen; when the vehicle runs along a curved course, it is continuously inclined sidewise under the centrifugal effect in a manner so as to descend on the radially outer side while rising on the radially inner side. In this state, the hydraulic cylinder assemblies are operated to slowly correct the changed height of the vehicle. When thereafter the vehicle is steered to traverse a reverse curve, it is excessively inclined which can endanger its running attitude due to long-time delay in the re-correcting operation of the hydraulic cylinder assemblies in combination with directioned reversion of vehicle inclination caused by change in direction of the centrifugal force.

SUMMARY OF THE INVENTION

In view of the above, this invention is intended to provide a novel and improved vehicle-height control device of the kind described above which is capable of avoiding the above danger by making the hydraulic cylinder assemblies for vehicle-height control inoperative during a turning movement of the vehicle.

The above and other objects, features and advantages of the present invention will become apparent from the following description when taken in conjunction with the accompanying drawings.

BRIEF DESCRIPTION OF THE DRAWINGS

In the drawings, which illustrate one preferred embodiment of the present invention.

DESCRIPTION OF THE PREFERRED EMBODIMENT

Figure 1:
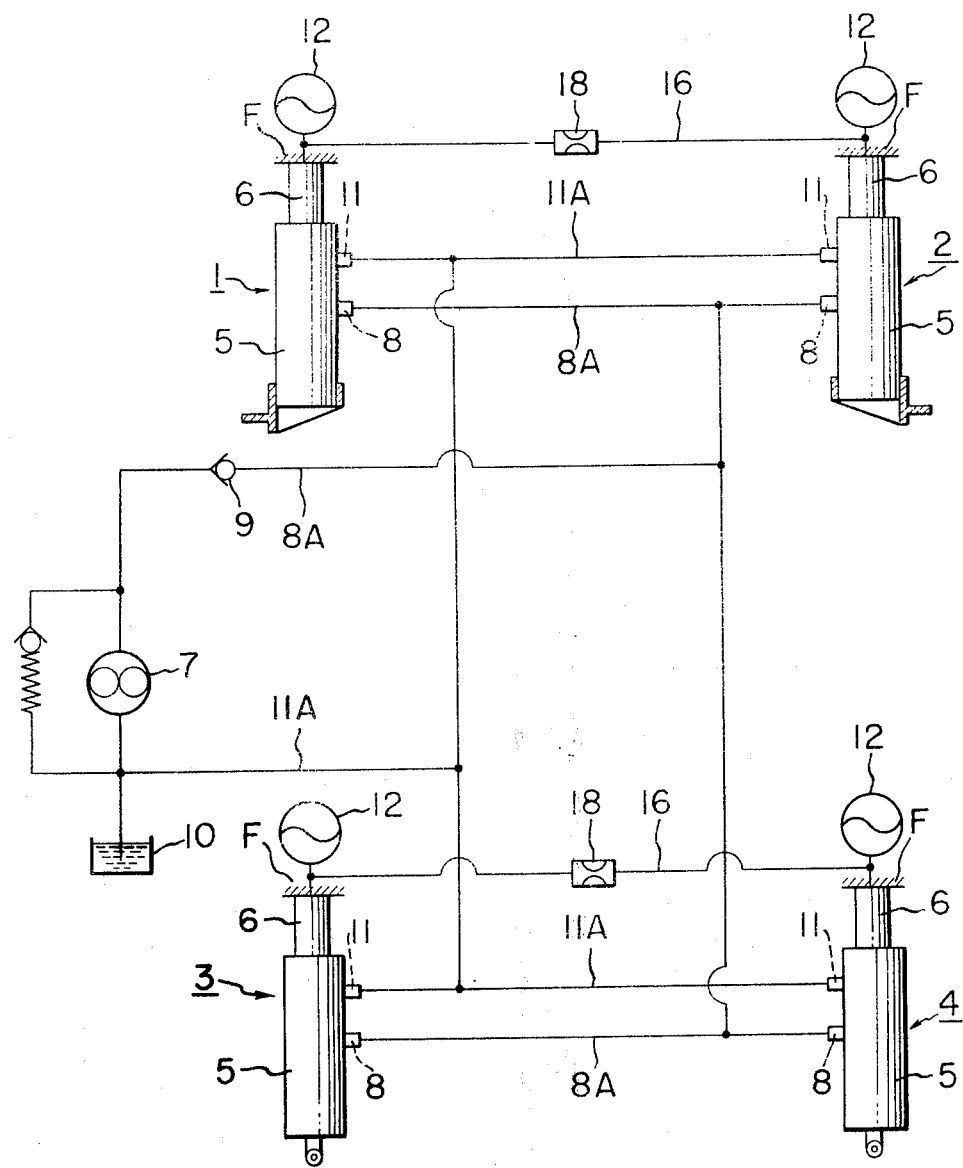
FIG. 1 represents an oil-hydraulic circuit diagram of the device embodying the present invention.

In FIG. 1, there is diagrammatically illustrated a height control device for automobile use embodying the present invention and including a set of four shock absorbers 1, 2, 3 and 4 arranged between the body frame F of an automobile and the two pairs of front and rear wheels, not shown. The shock absorbers are each telescopically constructed with an outer tubular member or cylinder 5 connected at the bottom with the associated wheel and an inner tubular member or cylinder 6 slidably fitted in the outer cylinder 5 and connected at the top to the body frame F. The outer cylinder 5 is provided in the side wall thereof with a pressure oil inlet port 8, and with an oil outlet port 11, which is located above the inlet port 8. The inlet ports 8 of the outer cylinders 5 of the respective shock absorbers are connected with a common pressure oil passage line 8A, which is led from the delivery port of an oil pressure pump 7 and includes a pressure retainer valve 9. Meanwhile, the outlet ports 11 of the respective outer cylinders 5 are connected with a common exhaust oil passage line 11A, which opens to an oil reservoir tank 10. A pressure accumulator 12, having a pressure gas chamber, is arranged above each of the inner cylinders 6 in communication with the interior space thereof. Further, each pair of the inner cylinders 6 fixed to the body frame F on the right and left sides thereof are connected with each other in fluid communication by means of a fluid passage line 16 including an orifice 18.

Description will next be made of the construction of the telescopic shock absorbers, which are all of the same construction, with reference to FIG. 2, which illustrates in section one of such shock absorbers, 3, associated with the rear left wheel.

Figure 2:
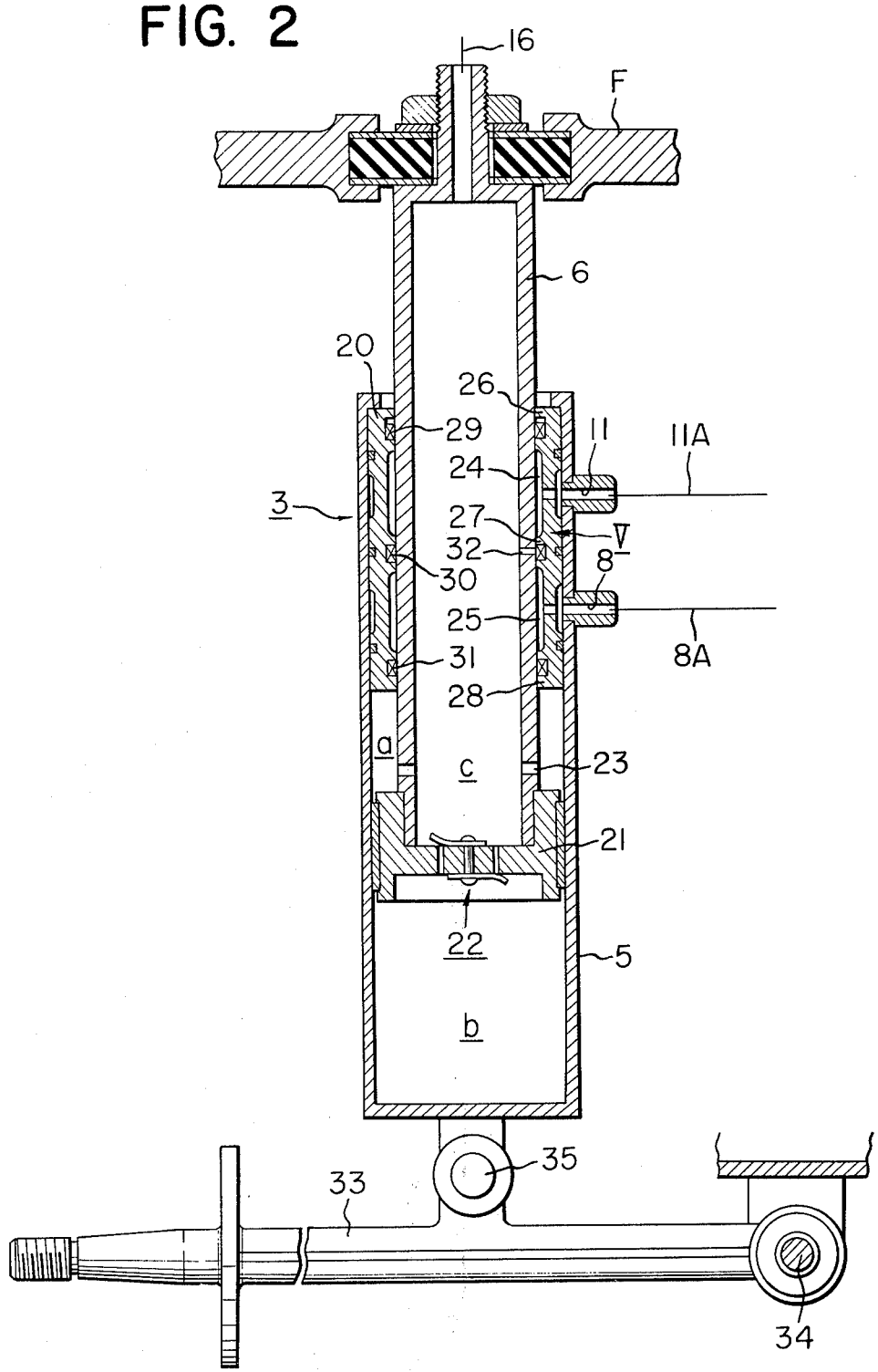
FIG. 2 is an axial cross-sectional view of one of the telescopic shock absorbers forming the essential part of the device.

As shown in FIG. 2, the inner cylinder 6 is supported for vertical sliding movement relative to the outer cylinder 5 by a tubular bearing member or sleeve 20 firmly fixed in the open top portion of the outer cylinder 5. A slide piston 21 is fixed to the bottom end of the inner cylinder 6 and is slidably fitted in the outer cylinder 5 to divide the interior space thereof into an upper and a lower oil chamber $a$ and $b$. The slide piston 21 is provided with a conventional buffer valve 22 which serves to control fluid communication between the upper and lower chambers $a$ and $b$. Further, the upper oil chamber $a$ in the outer cylinder 5 is held in fluid communication with another oil chamber $c$ defined in the inner cylinder 6 through apertures 23 formed in the wall thereof.

The slide bearing or sleeve 20 has a pair of upper and lower annular grooves 24 and 25 formed in the inner peripheral surface thereof and normally held in communication with the oil outlet port 11 and the oil inlet port 8, respectively, of the outer cylinder 5. Seal members 29, 30 and 31 are fitted, as shown, in the respective land portions 26, 27 and 28 of the inner peripheral surface of bearing sleeve 20. The central land portion 27, having a predetermined axial width, forms an oil control valve, V, in co-operation with an aperture 32 extending through the adjacent side wall of the inner cylinder 6. It is to be understood that the aperture 32 is so sized as to provide a resistance to oil flow therethrough larger than that of the buffer valve 22.

Again referring to FIG. 2, reference numeral 33 designates a swing axle provided to support a rear wheel and pivoted at its base end to the body frame F, as indicated at 34. The swing axle 33 is also pivoted intermediate its ends to the bottom of the outer cylinder 5 of the associated shock absorber 3, as indicated at 35, and supports a rear wheel, not shown, at the free end.

The operation of the height control device as described above will next be described. In the normal state when the vehicle is at its normal height, the aperture 32 in the inner cylinder 6 is covered by the slide bearing 20, lying within the axial range of the central land portion 27 thereof, as shown in FIG. 2, so that the upper and lower annular grooves 24 and 25 in the slide bearing 20 are out of fluid communication with each other and with the oil chamber c. It is to be noted in this connection that the lower annular groove 25 is held at all times under oil pressure, communicating with the pressure oil passage line 8A, and the pressure oil held in the groove 25 tends to leak to the low pressure side and more particularly to the top end of slide bearing 20. However, on account of the upper annular groove 24, lying between the lower annular groove 25 and the top end of slide bearing 20 and at all times held in communication with the exhaust oil passage line 11A, the pressure oil in the lower annular groove 25 can only flow out into the exhaust oil passage line 11A, but can never leak exteriorly through the top end of slide bearing 20, even if allowed to leak upwardly from the lower groove 25.

Now, it is assumed that the height of the vehicle is reduced below the normal level under the vertically downward force acting upon the body frame F and increasing with the passenger and/or luggage load. Under the condition, the inner cylinder 6 of each of the shock absorbers 1 to 4 is moved downward relative to the outer cylinder 5 and the oil aperture 32 is moved away from the lower edge of the central land portion 27 of slide bearing 20 to open into the lower annular groove 25 therein. As a result, the oil chamber c in the inner cylinder 6 is placed in fluid commuication with the pressure oil passage line 8A through the oil aperture 32 and lower annular groove 25, which is at all times in communication with the pressure oil inlet line 8A, so that pressure oil from the oil pressure pump 7 is fed to the oil chamber c and hence to the upper and lower oil chambers a and b in the outer cylinder 5 through the apertures 23 and buffer valve 22, respectively, to exert the oil pressure upon both the upper and lower end surfaces of the slide piston 21. Accordingly, the slide piston 21 top exposed area is smaller than its bottom exposed area is driven upwardly until the oil aperture 32 is restored to its normal position and closed again by the central land portion 27 of the slide bearing 20 to de-energize the oil chamber c in the inner cylinder 6. Simultaneously with this, the vehicle height is obviously restored to its normal level and the slide piston 21 comes to a stop to maintain the normal height of the vehicle.

Contrariwise, if the downward load upon the body frame F is reduced to increase the vehicle height above the normal level, the oil aperture 32 in the inner cylinder 6 the upper annular groove 24 in the slide bearing 20 to place the oil chamber c in communication with the exhaust oil passage line 11A and in this manner the slide piston 21 is allowed to descend until the normal vehicle height is restored. It will be understood that such function of compensating the vehicle height is effected by each of the shock absorbers 1, 2, 3 and 4 independently from each other so that lateral inclination of the body frame F resulting from one-sided load or sudden brake engagement can also be effectively corrected by the height control device in an automatic fashion.

If the wheels of the vehicle are caused to oscillate up and down as when the vehicle travels over an irregular road surface, the shock absorbers 1, 2, 3 and 4 associated with the respective wheels are caused to extend and contract independently from each other and, in each of the shock absorbers, the buffer valve 22 gives an appropriate flow resistance to the oil flowing back and forth between the upper and lower oil chambers a and b connected with each other through the oil chamber c, so that vibrations and/or shocks given to the body frame F are effectively alleviated as with the case of conventional shock absorbers. During such telescopic operation of the shock absorbers 1, 2, 3 and 4, the oil aperture 32 formed in the side wall of the inner cylinder 6 may sometimes open to the upper and lower annular grooves 24 and 25. In such cases, however, the amount of oil flow through the aperture 32 is very limited on account of the relatively high frequency of the telescopic action of the shock absorber and the substantial resistance of the aperture 32 to the oil flow therethrough and the vehicle height remains substantially unchanged.

During turning movement of the vehicle, the body frame F is more or less inclined sidewise in a continuous manner under the centrifual effect to lower on the radially inner side while raising on the radially outer side. If, in such situation, the vehicle-height compensating function of the telescopic shock absorbers 1 to 4 are performed slowly, the re-compensating operation of the shock absorbers when the turning direction of the vehicle is subsequently reversed must be delayed to a substantial extent. This delay in operation, in combination with the tendency of the vehicle to tilt in the opposite direction under the centrifugal force now changed in direction, might cause unusual sidewise inclination of the vehicle, endangering its travel.

In order to avoid such danger, each pair of right and left shock absorbers 2 and 1 or 4 and 3, in the embodiment illustrated, are held in fluid communication with each other by way of the oil passage line 16 with orifice means 18 inserted therein, as described hereinbefore. With this arrangement, when the vehicle is turned during travel and the opposite sides of the body frame F are raised and lowered, respectively, oil may be fed through the pressure oil passage line 8A into the shock absorbers arranged on one or the other side of the vehicle, e.g., shock absorbers 1 and 3 and tend to flow through the respective oil passage lines 16 to the shock absorbers 2 and 4 arranged on the opposite side of the vehicle. On the other hand, the shock absorbers 2 and 4 are reduced in pressure as they are exhausted through the oil passage line 11A, thus allowing the pressure oil flowing out of the shock absorbers 1 and 3 to flow through the orifices 18 into the respective shock absorbers 2 and 4 to immediately establish a state of hydraulic equilibrium between the shock absorbers 1 and 3, on the one hand, and the shock absorbers 2 and 4, on the other hand. In this manner, the shock absorbers 1 to 4 are disabled or get rid of any vehicle-height compensating function, enabling the vehicle to run the curved course in the same way as with the case of an ordinary vehicle not equipped with any height control device.

Incidentally, in the event that the two shock absorbers on either side of the vehicle are contracted on account of a one-sided load, they can function in the usual manner to compensate the change in height of the vehicle on that side due to the fact that the two shock absorbers on the other side remain at this time unextended unlike those on the radially inner side when the vehicle is turned and the tendency of the pressure oil fed to the contracted shock absorbers to flow out through the oil passage lines 16 to the shock absorbers on the opposite side is effectively resisted by the orifice means 18 provided in the oil passage lines 16.

As apparent from the foregoing description, in the height control device of the present invention, when the vehicle runs a curved course, each pair of hydraulic cylinder assemblies for height control disposed on the right and left sides of the vehicle body frame are held balanced in pressure thereby to prevent the perilous inclination of the vehicle due to a time lag in operation of the hydraulic cylinder assemblies simply by intercommunicating the interiors thereof with each other through the orifice means. Furthermore, changed height of the vehicle due to increasing or decreasing of passenger and/or luggage load can be corrected in a sure and exact manner.

We claim:

1. An automatic vehicle-height control device for use on a vehicle having a body with left and right sides and front and rear wheels at said left and right sides, said device comprising a plurality of hydraulic cylinder assemblies disposed between the body and respective road wheels of the vehicle on the left and right sides thereof, each of said cylinder assemblies including a pair of hollow inner and outer telescopic cylindrical members in fluid communication with each other, each hollow cylinder assembly defining an interior hollow space, said outer member having a fluid inlet port and a fluid outlet port extending therethrough, said inlet port being in communication with a source of fluid under pressure, said outlet port being in communication with ambient atmosphere, said inner telescopic member being vertically slidable and sealingly supported in said outer member, an annular bearing member interposed between said telescopic members, said bearing member having a pair of upper and lower annular grooves facing said inner telescopic member and a land portion of a predetermined vertical length defined between said grooves, said inner telescopic member having a through aperture located in a position to be closed by said land portion of said bearing member when the relative length between said inner and outer members is within a predetermined normal range, said aperture being operable to control the communication between said fluid outlet or inlet port and the interior space of the associated cylinder assembly in accordance with relative telescopic movement between said inner and outer members, and means including a hydraulic resistance connecting the interior spaces of a respective pair of said hydraulic cylinder assemblies positioned on the right and left sides of the vehicle.

2. A device as claimed in claim 1, wherein said hydraulic resistance is a restricted orifice.

3. A device as claimed in claim 1, wherein said annular bearing member is secured to said outer member.

4. A device as claimed in claim 1, further comprising a buffer valve between said inner and outer members to provide a resistance to flow of fluid in each of said hydraulic cylinder assemblies between said inner and outer members upon relative sliding movement thereof.

5. A device as claimed in claim 4, wherein said through aperture provides a resistance to fluid flow larger than that of said buffer valve.

6. A device as claimed in claim 1 wherein said means connecting the interior spaces of said pair of the hydraulic cylinder assemblies on the right and left sides of the vehicle comprises a conduit, said hydraulic resistance being a restricted orifice in said conduit.

7. A device as claimed in claim 1 wherein said hydraulic cylinder assemblies are four in number, one pair at the front of the vehicle, the other pair at the rear of the vehicle, said means comprising a conduit connecting the interior spaces of each respective pair together.

8. A device as claimed in claim 7 wherein said flow resistance comprises a restricted orifice in each conduit.

* * * * *